Jan. 20, 1970  G. G. RAMSAY  3,490,553

ELECTRICAL WEIGHING APPARATUS

Filed Sept. 18, 1967  2 Sheets-Sheet 1

United States Patent Office 3,490,553
Patented Jan. 20, 1970

3,490,553
ELECTRICAL WEIGHING APPARATUS
Graham G. Ramsay, Llanyravon, Cwmbran, Wales, assignor to Girling Limited
Filed Sept. 18, 1967, Ser. No. 668,407
Int. Cl. G01g 3/14
U.S. Cl. 177—210                        10 Claims

ABSTRACT OF THE DISCLOSURE

Electrical weighing apparatus includes a load cell stressed by the weight to be measured and yielding an output signal non-linearly related to applied load. A self-adjusting circuit balances the signal from the load cell against a signal from a motor-driven potentiometer, thus producing adjustment of the potentiometer, which controls display means indicating or recording the measured weight. To correct for non-linearity of the load-cell, switch means actuated in accordance with the potentiometer setting varies the magnitude of one of the compared signals in such manner as to reduce any discrepancy between the true and displayed weights.

---

Figure 1:
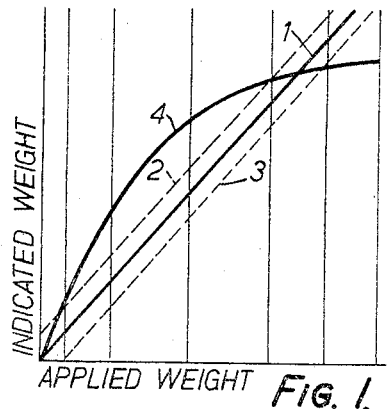

This invention relates to improvements in electrical weighing apparatus of the kind in which a signal derived from one or more load cells stressed in accordance with a weight to be measured is balanced by a servo-controlled potentiometer of which the position at balance serves as a measure of the weight.

It is known that one or more load cells stressed by a weight to be determined provide a signal of which the amplitude is related to the amount of the weight. It would be convenient if the electrical signal so derived were linearly related to the load, for it would then be possible to balance the signal from the cell or cells against a signal taken from a linear potentiometer, the setting of which at balance would then be directly representative of the weight. While some approximation to a linear characteristic is in practice obtained, this approximation is insufficiently close for certain purposes, so that a means of compensating for the non-linearities in the load/output characteristics of the load cells is required.

It is an object of the present invention to provide electrical weighing apparatus wherein errors of weighing are reduced.

It is a more specific object of the invention to provide electrical weighing apparatus wherein an electrical output signal is proportional to the true weight of a weighted object within predetermined tolerances.

It is a further object of the invention to provide electrical weighing apparatus wherein electrical resistors are connected in a blance circuit in accordance with the measured weight in such a manner as to reduce any discrepancy between the true and the measured weight.

Yet another object of the invention is to provide electrical weighing apparatus wherein the non-linear relation between the weight stressing a load cell and the magnitude of a signal derived from said load cell is compensated.

Electrical weighing apparatus according to the invention comprises in combination a source of electric current; a load cell stressed by a weight to be measured; circuit means feeding current from said source to said cell to develop thereacross a first comparison signal having a magnitude non-linearly related to said weight; a potentiometer having a motor-adjusted slider; a further current source circuit means applying current from said further source to said potentiometer to develop thereon a second comparison signal having a magnitude linearly related to the state of adjustment of the slider of potentiometer; comparator means developing an output signal related to the difference between two applied signals; circuit means applying said first and second comparison singals to said comparator; means applying said comparator output signal to control the state of adjustment of said potentiometer slider thereby to produce equality of magnitude between said comparison signals; and display means responsive to said potentiometer to display a measured weight linearly related to the state of adjustment of said potentiometer; and includes the improvement which comprises control means actuated in accordance with the state of said potentiometer, said control means operating to vary the magnitude of one of said comparison signals whereby to reduce any discrepancy between the true and the displayed weight.

Figure 4:
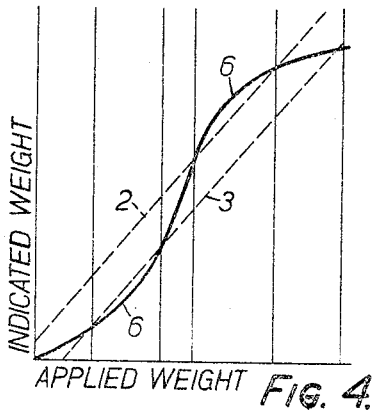
Figure 2:
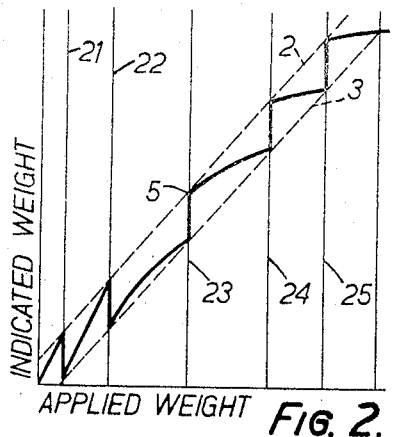
Figure 5:
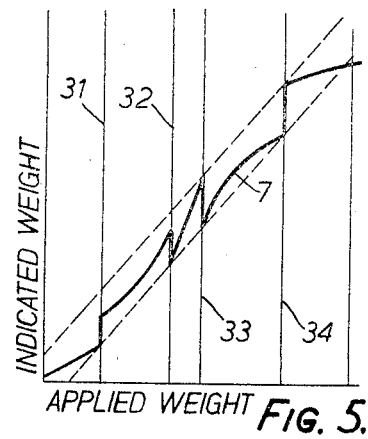
Figure 3:
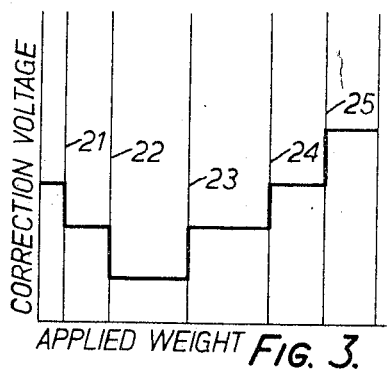
Figure 6:
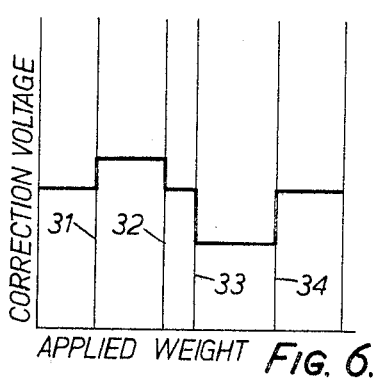
Figure 7:
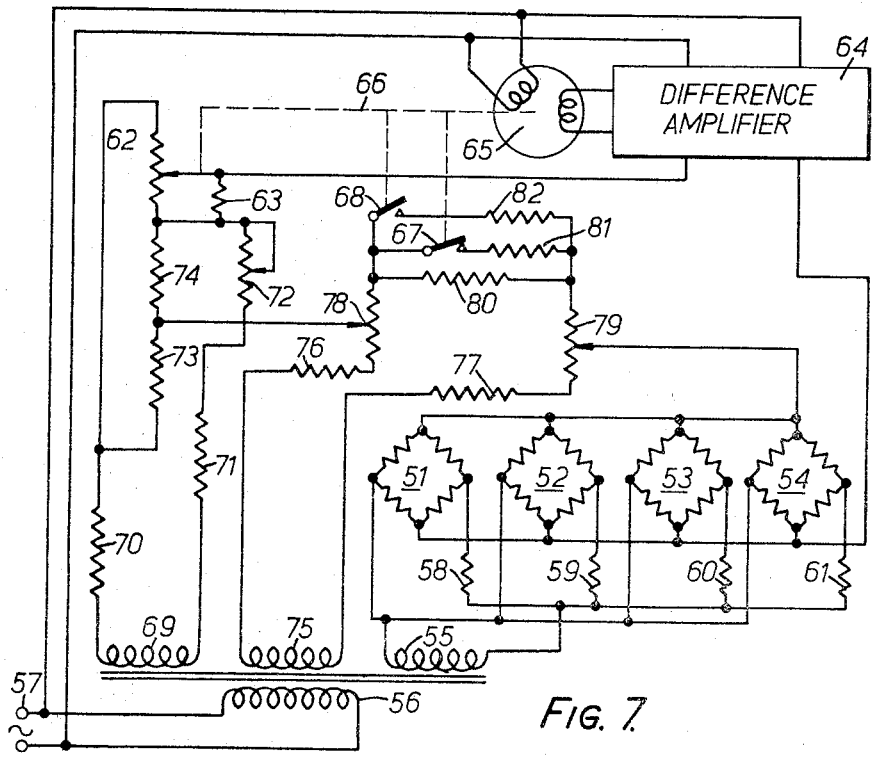
Figure 8:
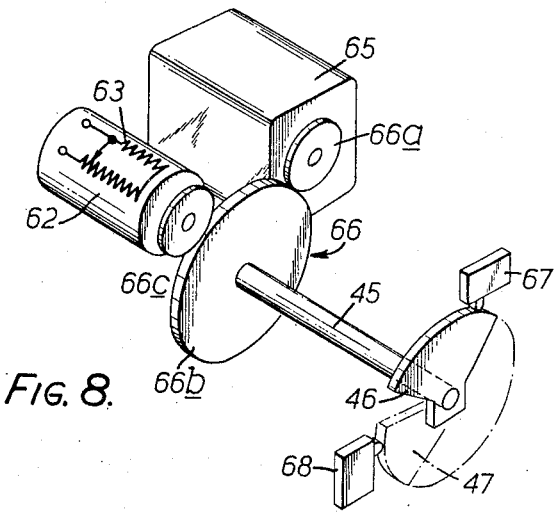

Features and davantages of the invention will appear from the following description of an embodiment thereof, taken in conjunction with the drawings, in the several figures of which like elements are denoted by like reference numerals, and in which:

FIGURE 1 is a graph representing the overall characteristic of known electrical weighing apparatus, FIGURE 2 is a graph showing how the error of the system represented by the graph of FIGURE 1 may be reduced in accordance with one feature of the present invention, FIGURE 3 shows the variation of a compensating voltage for yielding the characteristic of FIGURE 2, FIGURE 4 is a graph showing how the error of the system represented by the graph of FIGURE 1 may be reduced in accordance with a further feature of the invention, FIGURE 5 is a graph showing how the error of the system represented in FIGURE 1 may be still furhter reduced by the use of both the features of the invention discussed with reference to FIGURES 2 and 4, FIGURE 6 is a graph showing the variation in a compensating voltage for yielding the characteristic of FIGURE 5, FIGURE 7 is a circuit diagram representing the electrical arrangements of one embodiment of apparatus according to the invention, and FIGURE 8 is a schematic diagram illustrating mechanical details of the embodiments described with reference to FIGURE 7.

FIGURE 1 is a graph in which indicated weight derived from a scale linearly related to the displacement of an adjustable element in a balancing network is plotted as ordinates against actual weight applied to the load cell from which the balanced signal is derived. The correct relationship between indicated and applied weights is that represented by a straight line 1. Parallel to line 1 and equally spaced from it are broken lines 2, 3 representing the permissible tolerance in the departure from the true indicated weight. It is apparent that the curved line 4, representing the practical system characteristic falls for the most part outside the area representing the allowed tolerance limits and that correction is therefore necessary. The non-linearity of the curve 4 has, of course, been exaggerated for clarity.

FIGURE 2 shows how the addition of compensating or correction voltages varying from part to part of the range of measurement of weight may be used to maintain the indicated weight at all times within the permitted tolerances, as indicated by the segmented characteristic 5. It will be seen that this characteristic is identical with curve 4 of FIGURE 1 over the range from 0 to ordinate 21, where curve 5 moves abruptly downwards from one tolerance limit to the other. Curve 5 is then again identical in form with curve 4 until the upper tolerance limit is again reached at ordinate 22, when a further downward excursion from one tolerance limit to the other occurs. The curve then again follows curve 4 until the lower tolerance limit is again reached at ordinate 23, when an upward excursion to the upper limit is produced, followed by similar upward excursions at ordinates 24 and 25.

FIGURE 3 shows the relation between the superimposed correcting voltage and the applied weight, the various steps in the correcting voltage being given the same numbers as the ordinates at which they occur in FIGURE 2.

While FIGURE 2 represents a useful improvement in the characteristic, it is desirable to reduce to a minimum the number of changes in correcting voltage which are required over the range of measurement of the apparatus because the number of circuit components is thereby reduced. If, instead of the voltage which is balanced against the voltage output from a load cell being taken from the slider of a linear potentiometer as previously discussed, the balancing voltage is taken from a potentiometer of which the slider is connected to one end by a resistor, then the effective shape of the characteristic 6 of the balancing network can by a suitable choice of resistor value become S-shaped as shown in FIGURE 4. The deviation of the curve 6 from the permissible tolerance region indicated by broken lines 2, 3 is less than that of curve 4 of FIGURE 1. For some applications this shape correction alone may be sufficient.

FIGURE 4 shows that only two changes are required in the curve 6, to bring it entirely within the tolerance band. FIGURE 5 shows the corrected characteristic 7 and FIGURE 6 shows the correcting voltage plotted against applied weight, the various steps being denoted with the same numerals as the intercepts in FIGURE 5 at which they occur.

FIGURE 7 shows the schematic circuit diagram of one embodiment of electrical weighing apparatus in accordance with the invention in which correction as shown in FIGURE 5 is achieved. Here four load-cells 51, 52, 53, 54, stressed by the load upon a structure, for example a weighbridge, are supplied with alternating voltage from a winding 55 of a transformer 56 fed from alternating current mains connected at terminals 57. Resistors 58, 59, 60 and 61 are selected to balance the load-cell output at ¼ full load.

The load-cells 51–54 are connected in parallel and their output voltage is compared with the voltage from a balancing circuit including a servo-controlled potentiometer 62, the slider of which is connected to one end of the resistance element by way of a further resistor 63 to produce the S-shaped system characteristic 6 which is discussed above and is shown in FIGURE 4. The comparison of the output and balancing voltages is effected in a difference amplifier 64 feeding one winding of a servomotor 65, of which another winding is fed from the A.C. mains. Motor 65 is connected through suitable gearing indicated only by a heavy broken line 66 to drive potentiometer 62 and also to operate switches 67, 68 in a dead-weight balancing network yet to be described.

The voltage applied to potentiometer 62 is derived from a secondary winding 69 of transformer 56, whence it is applied by way of limiting resistors 70, 71 and an adjustable resistor 72 to the parallel combination of potentiometer 62 and two series-connected resistors 73, 74 which provide an artificial electrical zero for potentiometer 62. The junction of resistors 73, 74 is taken by way of a switched resistance network to one output lead from the load-cells 51–54, the other load-cell output lead going to amplifier 64. The switched resistance network is fed from a secondary winding 75 of transformer 56 by way of limiting resistors 76, 77 with a current in the same phase to that fed through potentiometer 62 so that the voltage appearing across the network is additive to that taken from the potentiometer.

The switched resistance network comprises coarse and fine adjustment potentiometers 78, 79 joined in series across the supply by a fixed resistor 80. Potentiometers 78, 79, to the sliders of which are connected respectively the artificial centre-tap on potentiometer 62 and an output lead from the load-cell circuit, are advantageously adjusted to bring the voltage appearing across the resistance included between them, comprised by parts of potentiometers 78, 79 and by fixed resistor 80, to approximately 90% of the output signal from the load-cell circuit due to the dead-weight of the weighbridge, when the switches 67, 68 are in the positions shown. The correcting voltages referred to above are derived by means of the switches 67, 68 and the resistors 81 and 82. The values of the resistors 81 and 82 are chosen to give the appropriate changes in the voltage supplied by the dead-weight balancing network as switches 67 and 68 open and close, to yield the overall characteristic 7 shown in FIGURE 5. The conditions under which these two switches are operated are shown below; the vertical lines representing ordinates in FIGURE 5;

|  | 0 | 31 | 32 | 33 | 34 |
| --- | --- | --- | --- | --- | --- |
| Switch 67 | Closed | Open | Closed | Closed | Closed |
| Switch 68 | Open | Open | Open | Closed | Open |

Opening of the switch 67 disconnects resistor 81, previously in shunt with resistor 80, thus giving an increase in the voltage drop across the dead-weight balancing network and effectively decreasing the level of the balancing signal, while the closing of switch 68 connects resistor 82 in shunt with resistors 80 and 81 to reduce that voltage, thus effectively increasing the level of the balancing signal.

FIGURE 8 shows schematically the mechanism by which the switches 67, 68 are operated. The potentiometer 62 is driven through the gearing 66, made up of gear wheels 66a, 66b, 66c, from the servo-motor 65. The motor 65 drives a shaft 45 connected to the gear 66b which performs not more than one revolution over the whole weighing range of the apparatus. The shaft 45 carries cam means taking the form of sector plates 46, 47 cooperating with the switches 67, 68 respectively.

If more than two steps of correction are required it is of course possible to provide more than two compensating resistors and switches. If desirable for convenience in initial adjustment, the sector plates may each be made in two mutually displaceable portions so that their effective angular extent may be varied, as well as their mean position about the shaft 45.

In any practical arrangement it is not possible to attain a perfectly linear characteristic, however closely an approach to the ideal linearity is achieved; the departures from linearity shown in FIGURES 1, 2, 4 and 5 are greatly exaggerated, for the purpose of clarity. With a weighbridge using load-cells as transducers, the non-linearity of the output of the load-cells is due to the fact that the short steel column in each cell which supports the applied load is a compression spring having in effect a non-linear rate. Load cells are corrected as far as possible to make their outputs linear, but it is desired not merely to correct the load-cell/weigh-bridge structure characteristic, but to correct the overall characteristic of load-cells and measuring circuit.

This is especially so when a printed indication of the weight measured is required. This necessitates the use of digitizing equipment and, although, for example, an error of ±28 pounds in a range of, say, 35 tons is permissible, there may be in effect a loss of accuracy of 14 pounds in the digitizing equipment due to the normal rounding-off or deletion process which is involved in all digitizing. Thus any other inaccuracy in the electrical circuit must be no greater than 14 pounds, otherwise any error over 14 pounds would mean that the total error would be too great. The effect is that, on this basis, a maximum total of only 14 pounds error in the 35 tons is permissible if the requirement is to be met.

In fact, even less error is desirable, to take care of electrical drift in the system over a period of time, and an ultimate requirement of about 7–8 pounds maximum error is desirable, or about 0.01% overall linearity. This degree of linearity has been shown to be attainable.

While a particular application of the invention is in obtaining the very high system accuracy which, as discussed above, is essential in weighing apparatus using printed read-out, the invention may also be employed to permit the use of cheaper and correspondingly less linear load-cells in systems using dial and pointer read-out where the fundamental load-cell accuracy may be less, because there is no rounding-off error resulting from the digitizing.

The invention is also applicable to apparatus of the kind in which a continuously weighed container, such as a vehicle standing in a weighbridge, is filled with a predetermined weight of a material, the supply of material being automatically cut off when a predetermined increase in weight has occurred.

I claim:

1. In an electrical weighing apparatus comprising in combination: a source of electric current; a load cell stressed by a weight to be measured; circuit means feeding current from said source to said cell to develop thereacross a first comparison signal having a magnitude non-linearly related to said weight; a potentiometer having a motor-adjusted slider, said slider being adjustable to any position within a predetermined range of movement; a further current source circuit means applying current from said further source to said potentiometer to develop thereon a second comparison signal having a magnitude linearly related to the state of adjustment of the slider of potentiometer; comparator means developing an output signal related to the difference between two applied signals; circuit means applying said first and second comparison signals to said comparator; means applying said comparator output signal to control the state of adjustment of said potentiometer slider thereby to produce equality of magnitude between said comparison signals; and display means responsive to said potentiometer to display a measured weight linearly related to the state of adjustment of said potentiometer; the improvement which comprises variable control means actuated in accordance with the position of said potentiometer slider within said range, said control means operating to vary the magnitude of one of said comparison signals whereby to reduce any discrepancy between the true and the displayed weight within said predetermined range.

2. The improvement claimed in claim 1 wherein said control means comprises switch means actuated by said potentiometer said switch means operating to control the inclusion in series with said comparison voltage of a resistor.

3. The improvement claimed in claim 1 wherein said control means comprises switch means actuated by said potentiometer, said switch means operating to control selectively the inclusion in series with said comparison voltage of a plurality of resistors each having a predetermined value, said switch means operating to include each said resistor in series with said comparison voltage over a unique portion of the range of adjustment of said potentiometer.

4. The improvement claimed in claim 3 wherein said values of said resistors are so chosen that the displayed weight differs from the true weight by not more than the same predetermined amount in either sense at any point within the range of measurement.

5. The improvement claimed in claim 1 wherein a fixed resistor connects said potentiometer slider to one end of said potentiometer whereby the graph relating indicated and true weight is generally S-shaped, wherein a circuit connecting said potentiometer and said load cells includes an adjustable resistance network having an effective value adjustable by said control means, together with an additional current source and means for passing current through said network from said additional source.

6. The improvement claimed in claim 1 wherein said control means comprises cam means coupled for movement together with the slider of said potentiometer and switch means actuated by said cam means.

7. The improvement claimed in claim 6 wherein said control means includes a plurality of said cam means, adjustably coupled for movement with said slider.

8. The improvement claimed in claim 5 wherein said network is connected between said load-cell circuit and the junction of two equal resistors connected in series across said potentiometer.

9. The improvement claimed in claim 5 wherein said resistance network includes a first preset potentiometer, a fixed resistor and a second preset potentiometer connected in series in the order stated, the slider of one said preset potentiometer being connected to the centre-tap on said potentiometer and the slider of the other said preset potentiometer being connected to the load-cell circuit.

10. The improvement claimed in claim 5 wherein said resistance network introduces into said balancing signal a component compensating for the dead-weight of the load-bearing parts of said apparatus.

References Cited

UNITED STATES PATENTS

| | | | |
|---|---|---|---|
| 2,630,007 | 3/1953 | Howe et al. | 177—210 |
| 2,944,808 | 7/1960 | Spademan | 177—210 |
| 3,106,979 | 10/1963 | Chilton | 177—210 |
| 3,166,135 | 1/1965 | Clamp | 177—211 |
| 3,173,507 | 3/1965 | Clamp | 177—211 |
| 3,221,828 | 12/1965 | Kohler | 177—210 |
| 3,221,829 | 12/1965 | Kohler | 177—210 |
| 3,295,368 | 1/1967 | Nevius | 177—211 X |

FOREIGN PATENTS

| | | |
|---|---|---|
| 730,576 | 3/1966 | Canada. |
| 730,577 | 3/1966 | Canada. |

RICHARD B. WILKINSON, Primary Examiner

GEORGE H. MILLER, Jr., Assistant Examiner